United States Patent Office 2,913,988
Patented Nov. 24, 1959

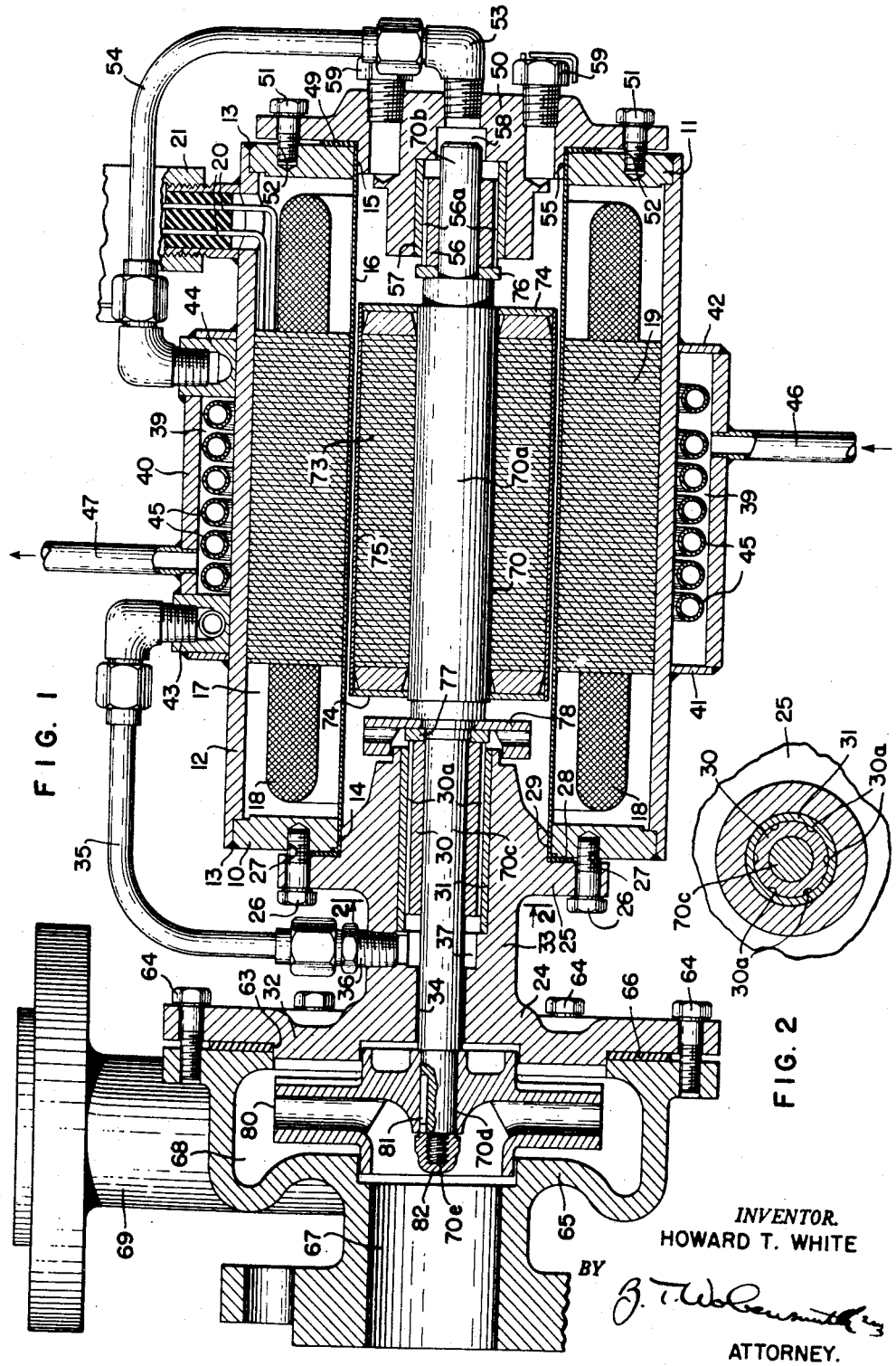

2,913,988
MOTOR DRIVEN PUMPS

Howard T. White, Melrose Park, Pa., assignor to Fostoria Corporation, Fostoria, Ohio, a corporation of Ohio Application April 6, 1956, Serial No. 576,558

2 Claims. (Cl. 103—87)

This invention relates to motor driven pumps.

In accordance with the present invention a motor driven pump is provided which is particularly suitable for handling fluids at high temperature levels of the order of 1000° F. or higher.

In accordance with the present invention a motor driven pump is provided having provisions for cooling both the rotor and stator of the motor.

In accordance with the present invention, also, a motor driven pump is provided having improved arrangements for obviating any likelihood of explosion if the fluid pumped or its vapors are of an explosive character.

In accordance with the present invention, also, a motor driven pump is provided having improved provisions for effecting a positive circulation of cooling and lubricating fluid.

In accordance with the present invention, also, an improved motor driven pump is provided in which a heat exchanger is exteriorly provided surrounding the motor stator.

Other objects and advantageous features of the invention will be apparent from the specification and claims.

The nature and characteristic features of the invention will be more readily understood from the following description, taken in connection with the accompanying drawings forming part thereof, in which:

Figure 1 is a vertical central sectional view of a motor driven pump in accordance with the invention; and Fig. 2 is a vertical sectional view taken approximately on the line 2—2 of Fig. 1.

It should, of course, be understood that the description and drawings herein are illustrative merely, and that various modifications and changes can be made in the structure disclosed without departing from the spirit of the invention.

Referring now more particularly to the drawings, the motor driven pump in accordance with the present invention preferably includes a pair of inner end frame plates 10 and 11, having an outer cylindrical housing 12 extending therebetween and held in fluid tight relation with respect thereto by continuous welds 13. The end plates 10 and 11 are provided with central openings 14 and 15.

Extending between the end plates 10 and 11, and in engagement in the openings 14 and 15, a cylindrical sleeve 16 is provided, of non-magnetic responsive material and which may be of stainless steel or other material resistant to corrosion by the liquid in contact therewith. The sleeve 16 is secured at its ends in fluid tight relation to the end plates 10 and 11 by welding or the like to provide an isolated and sealed motor stator chamber 17 in the space between the end plates 10 and 11 and between the housing 12 and the sleeve 16.

Within the chamber 17, field windings 18 and laminated field pieces 19 are provided, the windings 18 being energized from any suitable source of alternating current delivered by conductors 20, also passing through the housing 12 with a sealed and liquid tight connection 21.

In order to close the terminal opening of the sleeve 16 at the plate 10, an end fitting 24 is provided having a plate portion 25 which is secured in position with respect to the inner end plate 10 by a plurality of bolts 26. The bolts 26 engage in blind holes 27 in the plate 10.

Interposed between the facing surfaces of the end plate 10 and closure plate portion 25, an annular gasket 28 is provided, of Teflon or other suitable material, which is compressed and held in fluid tight engagement by the tightening of the bolts 26.

The fitting 24 has an annular inwardly extending rim portion 29 with an outer peripheral surface in engagement with the interior of the sleeve 16 and of a predetermined length and with a predetermined clearance as hereinafter explained.

The fitting 24 has, interiorly disposed with respect to the plate portion 25, a cylindrical bearing ring 30 of graphite, or the like. The bearing ring 30 is carried within an outer metallic holder sleeve 31 and interiorly of the sleeve 31 has a plurality of longitudinally axially extending grooves 30a for fluid circulation.

The fitting 24 has a plate portion 32 connected to the plate portion 25 by a neck 33 of reduced diameter to reduce and restrict the heat flow from the plate portion 32 towards the plate portion 25, as hereinafter explained. The plate portion 32 has an interior bore 34 of predetermined diametrical relation and length, as hereinafter explained.

The neck 33 has a fluid connection 35 extending to a fitting 36 carried thereby and is provided with an interior annular groove 37 with which the grooves 30a of the bearing ring 30 and the fitting 36 are in communciation.

On the exterior of the housing 12, and in spaced relation thereto, an outer cylindrical housing plate 40 is provided, with end walls 41 and 42 secured thereto and to the housing 12 in fluid tight relation to provide a cooling chamber 39.

A fitting 43 is provided to which the pipe 35 is connected and a fitting 44 is also provided. The interiors of the fittings 43 and 44 are preferably connected by a helical coil 45 disposed in the cooling chamber 39 and providing a closed fluid path. The cooling chamber 39 has a cooling fluid supply connection 46 in communication therewith and a cooling fluid discharge connection 47 in communication therewith for supplying cooling fluid, such as water, thereto and to the exterior of the coil 45.

In order to close the other terminal opening of the sleeve 16 at the end plate 11, an outer end closure plate 50 is provided which is secured in position on the end plate 11 by bolts 51 which engage in blind holes 52 in the end plate 11.

Interposed between the facing surfaces of the end plate 11 and the closure plate 50, an annular gasket 49 is provided, of Teflon or other suitable material which is compressed and held in fluid tight engagement by the tightening of the bolts 51. The closure plate 50 has centrally mounted thereon a fitting 53 which is connected by a pipe 54 from the fitting 44 for the delivery of liquid, as hereinafter explained.

The closure plate 50 has a boss 55 extending inwardly within the sleeve 16 with an outer peripheral surface in engagement with the interior of the sleeve 16 and of a predetermined length and with a predetermined clearance, as hereinafter explained.

The closure plate 50 has interiorly disposed with respect thereto a cylindrical bearing ring 56 of graphite, or the like. The bearing ring 56 is carried within an outer metallic holder sleeve 57 and interiorly of the sleeve 57 has a plurality of longitudinally axially extending grooves 56a, which are in communication with the fitting 53 through an end chamber 58.

A plurality of vent plugs 59 can be provided in communication with the space around the boss 55.

The plate 32 preferably has mounted thereon, on a shoulder 63, and held in any suitable manner such as by bolts 64, an impeller housing 65. An annular gasket 66, of Teflon or the like, is interposed between the facing surfaces of the plate 32 and the impeller housing 65 and is compressed and held in fluid tight engagement by the tightening of the bolts 64.

The impeller housing 66 preferably has an axially disposed fluid inlet 67 in communication with an impeller chamber 68 formed as part of a scroll and has a tangential fluid delivery connection 69.

A shaft 70 is provided having an enlarged portion 70a on which a motor rotor 73 is mounted for coaction with the motor stator 19. The motor rotor 73 is shown as enclosed between rotor end plates 74, secured to the shaft portion 70a in fluid tight relation, and an outer cylindrical housing 75 secured to the end plates 74 in fluid tight relation.

The motor rotor 73 can be of any desired type, a laminated short circuited type being preferred.

The shaft 70 has a portion 70b of reduced diameter in the bearing ring 56 and has a thrust ring 76 mounted thereon in engagement with the inner end of the bearing ring 56 to accommodate the axial thrust.

The shaft 70 also has a portion 70c in the bearing ring 30 and is provided with a thrust ring 77 for engagement with the inner end of the bearing ring 30 to accommodate the axial thrust.

Mounted on the shaft 70 at the thrust ring 77 a small impeller 78 is provided in communication with the interior space within the sleeve 16 and in communication with the annular groove 37 through the grooves 30a.

The shaft 70 has a portion 70d extending within the impeller chamber 68 and has mounted thereon an impeller 80 which is held by a key 81 and by an end nut 82 on a threaded end portion 70e of the shaft 70.

If the motor driven pump is intended to be used for fluids which themselves are of an explosive character or have vapors of an explosive character, closely controlled clearances are provided at particular locations.

One of these flame traps or paths is provided between the inner surface of the bore 34 and the outer surface of the shaft portion 70c and for a three horsepower pump is of an axial length of the order of one inch and a diametrical clearance between these surfaces of the order of 0.020 inch. This restricted area and length are such that any vapor therein would be incapable of igniting. The small size of orifice at this location provides an adiabatic expansion of any gas passing therethrough, thus providing a flame trap. At the same time the contiguous metallic walls have a further tendency to cool the gas by conducting heat away and any flame which may be present will be unable to pass through the restriction or barrier thus provided.

In the same manner, for the capacity of pump stated clearance spaces having an axial length of the order of three-eighths of an inch are provided between the rim portions 29 and 55 and the sleeve 16 with a maximum diametrical clearance of the order of 0.0015 inch. The restricted orifices thus provided at these locations also provide flame traps of the character previously described, thus preventing any passage of flame or the occurrence of any explosion at or beyond these locations.

The mode of use will now be pointed out.

Upon energization of the windings 18, rotation of the motor rotor 73 is effected. The motor rotor 73 turns the shaft 70 which is supported in the bearing rings 30 and 56 and is also held by the thrust rings 76 and 77 and rotary motion is imparted to the impeller 80.

Fluid entering at the fluid inlet 67 is delivered by the impeller 80 to the fluid delivery connection 79. The temperature of the fluid pumped can be in the range of 1000° F. to 1500° F. if desired.

A portion of the fluid in the impeller housing 65 may pass through the clearance space between the bore 34 and the shaft portion 70c and to the space within the sleeve 16, until equilibrium conditions are established such that very little fluid flow occurs in either direction at this location.

Fluid in the interior of the sleeve 16 has pressure imparted thereto by the impeller 78 so that a flow path is set up from the impeller 78, past the motor rotor 73 in the clearance space between the housing 75 and the sleeve 16, extracting heat from the motor rotor 73, sleeve 16 and motor stator interior in passing, then to and around the thrust ring 76 and through the bearing ring 56 and its grooves 56a to the chamber 58, then through the fitting 53, the pipe 54 and the fitting 44 to the helical coil 45. The cooling liquid supplied through the pipe 46 and circulated in the cooling chamber 39 is effective for carrying away heat from the liquid in the coil 45 and also heat from the motor stator in the motor stator chamber 17, and then passes out through the discharge pipe 47.

The cooled liquid in the coil 45 then passes through the fitting 43, the pipe 35 and the fitting 36 to the annular groove 37, thus providing a cool fluid barrier at the neck 33 to further reduce the heat transfer from the pump towards the motor, particularly if high temperature fluids are being pumped.

The liquid from the groove 37 passes through and around the bearing ring 30, and the grooves 30a, to the impeller 78 for continued circulation.

It will be noted that both the motor rotor and the motor stator are cooled so that overheating thereof is avoided, particularly when highly heated liquids are being pumped.

At the same time the restricted neck 33 and the cooling action of the cool liquid filled groove reduce the effect of heat from the pump.

As previously pointed out, the structure with its completely sealed stator chamber 17, and with flame traps at the possible exits from or entrances to the motor rotor chamber within the sleeve 16 is free from the likelihood of explosions if fluids having such tendencies are being pumped.

Adequately lubricated and cooled bearings are also provided.

I claim:

1. A motor driven pump comprising a motor housing having a motor stator and a motor rotor therein, a cylindrical sleeve in said housing and separating and isolating the motor stator from the motor rotor, the interior of said sleeve providing a motor rotor chamber, end closure members for said motor rotor chamber extending inwardly along said sleeve a predetermined distance and with a diametrical clearance with respect to said sleeve to provide flame barriers, a shaft to which the motor rotor is connected, bearings for said shaft carried by said closure members, a pump housing mounted on said motor housing and having an impeller chamber therein, fluid inlet and delivery connections connected to said impeller chamber, a fluid impeller in said impeller chamber mounted on said shaft, the shaft between the impeller chamber and the motor rotor having a portion of a predetermined length and with a diametrical clearance with respect to the end closure member through which it extends to provide a flame barrier.

2. A motor driven pump comprising a motor housing having a motor stator and a motor rotor therein, a cylindrical sleeve in said housing and separating and isolating the motor stator from the motor rotor, the interior of said sleeve providing a motor rotor chamber, end closure members for said motor rotor chamber extending inwardly along said sleeve a distance of the order of three eights of an inch and with a diametrical clearance with respect to said sleeve of the order of less than fifteen ten thousandths of an inch to provide flame traps, a shaft to which the motor rotor is connected, bearings for said shaft carried by said closure members, a pump housing mounted on said motor housing and having an impeller chamber therein, fluid inlet and delivery connections connected to said impeller chamber, a fluid impeller in said impeller chamber mounted on said shaft, the shaft between the impeller chamber and the motor rotor having a portion of a length of the order of one inch with a diametrical clearance with respect to the end closure member through which it extends of less than twenty thousandths of an inch to provide a flame trap.

References Cited in the file of this patent

UNITED STATES PATENTS

| | | |
|---|---|---|
| 2,120,914 | Vogel | June 14, 1938 |
| 2,687,695 | Bloom, et al. | Aug. 31, 1954 |
| 2,737,120 | Ivanoff et al. | Mar. 6, 1956 |
| 2,768,584 | Nicol et al. | Oct. 30, 1956 |
| 2,799,227 | Allen | July 16, 1957 |

FOREIGN PATENTS

| | | |
|---|---|---|
| 157,495 | Austria | Nov. 25, 1939 |
| 305,818 | Switzerland | Mar. 15, 1955 |
| 1,111,911 | France | Nov. 2, 1955 |